US010754881B2

(12) United States Patent
Plachouras et al.

(10) Patent No.: US 10,754,881 B2
(45) Date of Patent: Aug. 25, 2020

(54) SYSTEM FOR NATURAL LANGUAGE INTERACTION WITH FINANCIAL DATA

(71) Applicant: Refinitiv US Organization LLC, New York, NY (US)

(72) Inventors: Vassilis Plachouras, London (GB); Jochen Lothar Leidner, London (GB); Charese Smiley, Eagan, MN (US); Hiroko Bretz, Roseville, MN (US)

(73) Assignee: REFINITIV US ORGANIZATION LLC, New York, NY (US)

( * ) Notice: Subject to any disclaimer, the term of this patent is extended or adjusted under 35 U.S.C. 154(b) by 191 days.

(21) Appl. No.: 15/429,483

(22) Filed: Feb. 10, 2017

(65) Prior Publication Data

US 2017/0228377 A1 Aug. 10, 2017

Related U.S. Application Data

(60) Provisional application No. 62/293,352, filed on Feb. 10, 2016.

(51) Int. Cl.
*G06F 16/332* (2019.01)
*G06Q 40/00* (2012.01)

(52) U.S. Cl.
CPC ......... *G06F 16/3329* (2019.01); *G06Q 40/00* (2013.01)

(58) Field of Classification Search
CPC .......... G06F 17/30654; G06F 16/3329; G06Q 40/00
USPC ........................................................ 707/718
See application file for complete search history.

(56) References Cited

U.S. PATENT DOCUMENTS

| 7,856,441 B1* | 12/2010 | Kraft .................... G06F 16/951 707/758 |
| 8,306,356 B1 | 10/2012 | Bever |
| 9,195,712 B2* | 11/2015 | Freedman ......... G06F 16/24542 |
| 9,529,795 B2 | 12/2016 | Kondadadi et al. |
| 2001/0051906 A1* | 12/2001 | Esposito ................ G06Q 10/10 705/35 |
| 2003/0069880 A1* | 4/2003 | Harrison ............. G06F 16/3334 |

(Continued)

OTHER PUBLICATIONS

Extended European Search Report, dated Jun. 8, 2015, p. No. 7.

(Continued)

*Primary Examiner* — Hosain T Alam
*Assistant Examiner* — Saba Ahmed
(74) *Attorney, Agent, or Firm* — Norton Rose Fulbright US LLP (57) ABSTRACT

The present invention is directed toward a system for database querying using natural language generation, which comprises identifying a first set of entities corresponding to an indexed data set in response to a user query, generating a ranked list of query intents using the first set of entities, wherein each item of the list of query intents represents a second set of entities associated with the user query and iterating over the ranked list of query intents to identify a top ranked intent associated to one of a set of predefined query plans. The predefined query plan associated with the top rank intent is executed using the set of entities corresponding to the top ranked intent, the predefined query plan comprising one or more search actions against the indexed data set. A first set of results is then received and a description is generated and transmitted.

10 Claims, 5 Drawing Sheets

(56) References Cited

U.S. PATENT DOCUMENTS

| | | | |
|---|---|---|---|
| 2008/0275748 A1* | 11/2008 | John | G06Q 30/06 |
| | | | 705/35 |
| 2009/0019020 A1* | 1/2009 | Dhillon | G06F 16/951 |
| 2009/0024620 A1 | 1/2009 | Kim | |
| 2010/0191740 A1* | 7/2010 | Lu | G06F 16/9535 |
| | | | 707/748 |
| 2011/0258049 A1* | 10/2011 | Ramer | G06Q 30/02 |
| | | | 705/14.66 |
| 2011/0270748 A1* | 11/2011 | Graham | G06Q 20/102 |
| | | | 705/40 |
| 2011/0295850 A1* | 12/2011 | Tankovich | G06F 17/00 |
| | | | 707/727 |
| 2012/0173373 A1* | 7/2012 | Soroca | G06Q 30/0241 |
| | | | 705/26.3 |
| 2013/0013616 A1 | 1/2013 | Leidner et al. | |
| 2013/0173604 A1* | 7/2013 | Li | G06F 16/9535 |
| | | | 707/723 |
| 2015/0066479 A1* | 3/2015 | Pasupalak | G06F 17/27 |
| | | | 704/9 |

OTHER PUBLICATIONS

Written Opinion and Search Report dated Aug. 13, 2012 for corresponding PCT application PCT/US2012/04572.
International Preliminary Report on Patentability, dated Jun. 2, 2015.

* cited by examiner

SYSTEM FOR NATURAL LANGUAGE INTERACTION WITH FINANCIAL DATA

RELATED APPLICATION

This application claims priority to U.S. Provisional Application 62/293,352 filed on Feb. 10, 2016, the contents of which are all incorporated herein in their entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to this document: Copyright© 2017 Thomson Reuters.

TECHNICAL FIELD

This disclosure relates generally to the database querying. More specifically, the disclosure is directed towards systems and methods for searching financial data with a keyword-based methodology and natural language generation to produce human-readable answers from the resulting data.

BACKGROUND

Financial and economic data serves as the lifeblood of analyses of an entire economy, whether on a geographical scale or across a business sector. Finance professionals rely heavily on such data to perform their analyses and have historically been required to use specialized software applications and interfaces to navigate and locate applicable data that can be time consuming and produce limited results. In addition, such specialized software applications and interfaces prove difficult to use by the less seasoned professionals and the novice.

Accordingly there exists a need for a system that enables both financial domain experts as a well as non-expert users to search financial data with keyword-based search queries in addition to natural language generation to produce human-readable answers from the data.

SUMMARY

The present invention is directed towards systems and methods for searching financial data with a keyword-based methodology and natural language generation to produce human-readable answers from the resulting data. In one aspect, the method includes identifying a first set of entities corresponding to an indexed data set in response to a user query and generating a ranked list of query intents using the first set of entities, wherein each item of the list of query intents represents a second set of entities associated with the user query. The ranked list of query intents is iterated to identify a top ranked intent associated to one of a set of predefined query plans and the predefined query plan associated with the top rank intent is executed using the set of entities corresponding to the top ranked intent, the predefined query plan comprising one or more search actions against the indexed data set. The present invention further comprises receiving a first set of results in response to one or more search actions, generating a description of the first set of results received from the search engine and transmitting the description in response to the user query.

According to one embodiment, the present invention further comprises transforming data stored in a database to an indexed data set using one or more parametric templates. In another embodiment, the second set of entities associated with the user query is generated by disambiguation of the first set of entities. In yet another embodiment, the predefined query plan further comprises at least one of filtering results according to a specified condition, ranking results according to the values of a given field or aggregating associated values.

A system, as well as articles that include a machine-readable medium storing machine-readable program code for implementing the various techniques, are disclosed. Details of various embodiments are discussed in greater detail below.

Additional features and advantages will be readily apparent from the following detailed description, the accompanying drawings and the claims.

BRIEF DESCRIPTION OF THE DRAWINGS

Like reference symbols in the various drawings indicate like elements.

DETAILED DESCRIPTION

In the following description, reference is made to the accompanying drawings that form a part hereof, and in which is shown by way of illustration specific embodiments in which the disclosure may be practiced. It is to be understood that other embodiments may be utilized and structural changes may be made without departing from the scope of the present disclosure.

Figure 1:
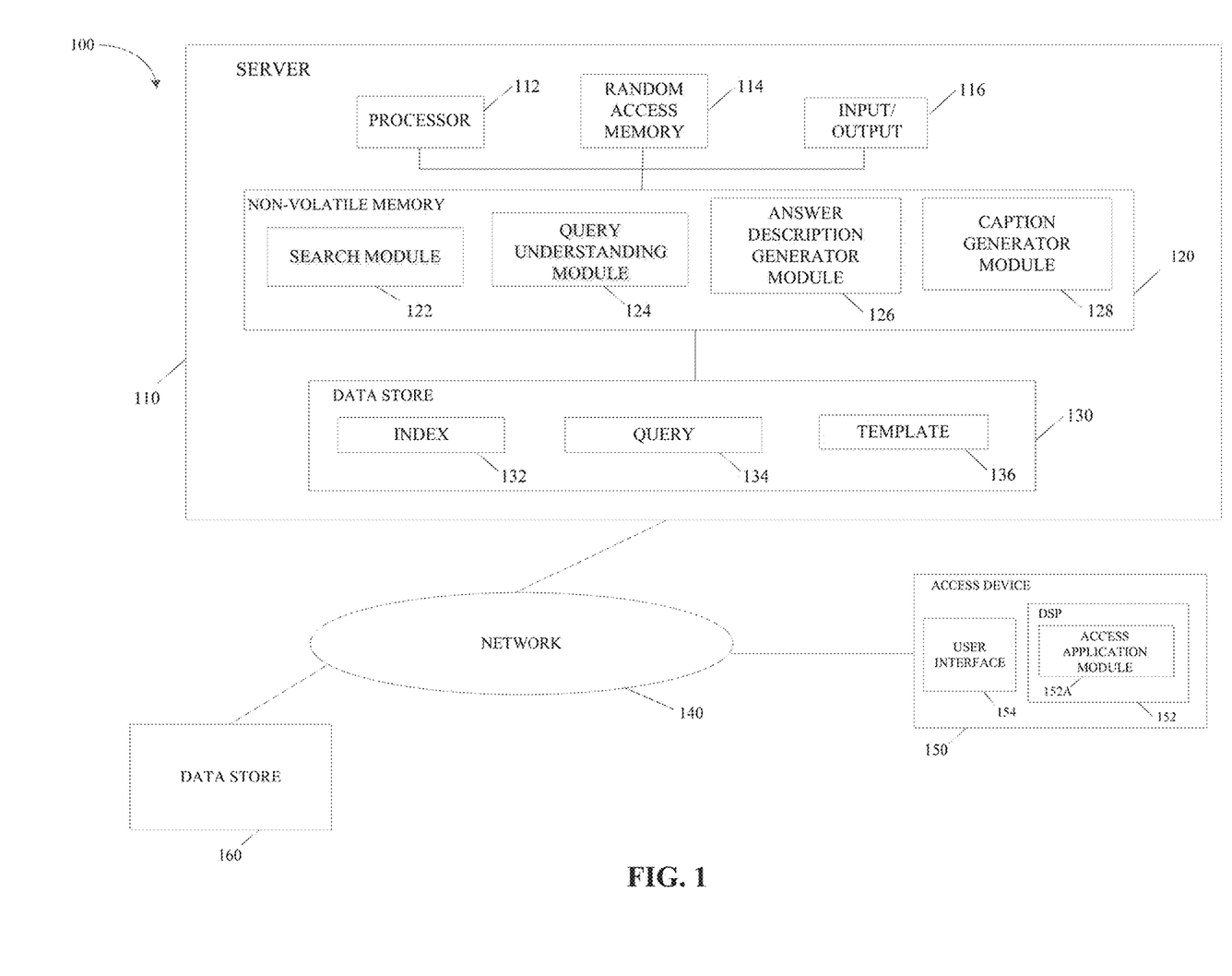
FIG. 1 is a schematic depicting an exemplary computer-based system for searching financial data with a keyword-based methodology and natural language generation to produce human-readable answers from the resulting data.

Turning now to FIG. 1, an example of a suitable computing system 100 within which embodiments of the disclosure may be implemented is presented. The computing system 100 is only one example and is not intended to suggest any limitation as to the scope of use or functionality of the disclosure. Neither should the computing system 100 be interpreted as having any dependency or requirement relating to any one or combination of illustrated components.

For example, the present disclosure is operational with numerous other general purpose or special purpose computing consumer electronics, network PCs, minicomputers, mainframe computers, laptop computers, as well as distributed computing environments that include any of the above systems or devices, and the like.

The disclosure may be described in the general context of computer-executable instructions, such as program modules, being executed by a computer. Generally, program modules include routines, programs, objects, components, data structures, loop code segments and constructs, and other computer instructions known to those skilled in the art that perform particular tasks or implement particular abstract data types. The disclosure can be practiced in distributed computing environments where tasks are performed by remote processing devices that are linked through a communications network. In a distributed computing environment, program modules are located in both local and remote computer storage media including memory storage devices. Tasks performed by the programs and modules are described below and with the aid of figures. Those skilled in the art may implement the description and figures as processor executable instructions, which may be written on any form of a computer readable media.

In one embodiment, with reference to FIG. 1, the system 100 includes a server device 110 configured to include a processor 112, such as a central processing unit ("CPU"), random access memory ("RAM") 114, one or more input-output devices 116, such as a display device (not shown) and keyboard (not shown), non-volatile memory 120 and data store 130, all of which are interconnected via a common bus and controlled by the processor 112.

As shown in the FIG. 1 example, in one embodiment, the non-volatile memory 120 is configured to include a search module 122, a query understanding module 124, an answer description translation module 126 and a caption generator module 128. The search module 122 is utilized to iterate a ranked list of entity groupings and search across the index data store 132. The query understanding module 124 serves to receive the questions from the access device 150, identify and rank a set of entities corresponding to index data in the index data store 132. The answer description module 126 is utilized to generate a high quality human-readable description of the search results responsive the other user query. The caption generator module 128 is utilized to index and store data in a database in a form that can be indexed by a search engine.

As shown in FIG. 1, in one embodiment, a network 140 is provided that can include various devices such as routers, server, and switching elements connected in an Intranet, Extranet or Internet configuration. In one embodiment, the network 140 uses wired communications to transfer information between an access device 150, the server device 110, the data store 130 and a data store 160. In another embodiment, the network 140 employs wireless communication protocols to transfer information between the access device 150, the server device 110, the data store 130 and the data store 160. For example, the network 140 may be a cellular or mobile network employing digital cellular standards including but not limited to the 3GPP, 3GPP2 and AMPS family of standards such as Global System for Mobile Communications (GSM), General Packet Radio Service (GPRS), CDMAOne, CDMA2000, Evolution-Data Optimized (EV-DO), LTE Advanced, Enhanced Data Rates for GSM Evolution (EDGE), Universal Mobile Telecommunications System (UMTS), Digital Enhanced Cordless Telecommunications (DECT), Digital AMPS (IS-136/TDMA), and Integrated Digital Enhanced Network (iDEN). The network 140 may also be a Wide Area Network (WAN), such as the Internet, which employs one or more transmission protocols, e.g. TCP/IP. As another example, the network 140 may employ a combination of digital cellular standards and transmission protocols. In yet other embodiments, the network 140 may employ a combination of wired and wireless technologies to transfer information between the access device 150, the server device 110, the data store 130 and the data store 160.

The data store 130 is a repository that maintains and stores information utilized by the before-mentioned modules 122 through 128. In one embodiment, the data store 130 is a relational database. In another embodiment, the data store 130 is a directory server, such as a Lightweight Directory Access Protocol ("LDAP"). In yet another embodiment, the data store 130 is an area of non-volatile memory 120 of the server device 110.

In one embodiment, as shown in the FIG. 1 example, the data store 130 includes an indexed data store 132 which maintains financial data in a searchable index, a query data store 134 that maintains the repository of query plans and a template data store 136 that maintains the repository of natural language generation templates. Although the data store 130 shown in FIG. 1 is connected to the network 140, it will be appreciated by one skilled in the art that the data store 130 and/or any of the information shown therein, can be distributed across various servers and be accessible to the server 110 over the network 140; be coupled directly to the server 110; be configured as part of server 110 and interconnected to processor 112, RAM 114, the one or more input-output devices 116 and the non-volatile memory 120 via the common bus; or be configured in an area of non-volatile memory 120 of the server 110.

The access device 150, according to one embodiment, is a computing device comprising: a touch-sensitive graphical user interface ("GUI") 154, a digital signal processor ("DSP") 152 having an access application module that allows a user to access the server 110, access application module 152A, transient and persistent storage devices (not shown); an input/output subsystem (not shown); and a bus to provide a communications path between components comprising the general purpose or special purpose computer (not shown). According to one embodiment, access application module 152A is web-based and uses thin client applications (not shown), such as a web browser, which allows a user to access the server 110. Examples of web browsers are known in the art, and include well-known web browsers such as such as MICROSOFT® INTERNET EXPLORER®, GOOGLE CHROME™, MOZILLA FIREFOX® and APPLE® SAFARI®. According to another embodiment, access device 150 is a mobile electronic device having a GUI, a DSP having an access application module, internal and external storage components; a power management system; an audio component; audio input/output components; an image capture and process system; RF antenna; and a subscriber identification module (SIM) (not shown). Although system 100 is described generally herein as comprising a single access device 150, it should be appreciated that the present invention is not limited to solely two access devices. Indeed, system 100 can include multiple access devices.

In one embodiment, the data store 160 is a relational database. In another embodiment, the data store 160 is a directory server, such as a Lightweight Directory Access Protocol ("LDAP"). In yet another embodiment, the data store 162 is an area of non-volatile memory 120 of the server device 110. In another embodiment, the knowledge data store 162 is an area of the data store 130 of the server device 110.

According to one embodiment, the data store 160 is an exemplary data store repository where unindexed data from multiple source aggregated is maintained. However, the present invention is not limited to a single data store where aggregated data is maintained but presented herein for exemplary purposes. In one embodiment, data store 160 is representative of multiple data stores associated with multiple financial sources.

Although the data store 160 shown in FIG. 1 is connected to the network 140, it will be appreciated by one skilled in the art that the data store 160 and/or any of the information shown therein, can be distributed across various servers and be accessible to the server 110 over the network 140; be coupled directly to the server 110; be configured as part of server 110 and interconnected to processor 112, RAM 114, the one or more input-output devices 116 and the non-volatile memory 120 via the common bus; or be configured in an area of non-volatile memory 120 of the server 110.

Further, it should be noted that the system 100 shown in FIG. 1 is only one embodiment of the disclosure. Other system embodiments of the disclosure may include additional structures that are not shown, such as secondary storage and additional computational devices. In addition, various other embodiments of the disclosure include fewer structures than those shown in FIG. 1. For example, in one embodiment, the disclosure is implemented on a single computing device in a non-networked standalone configuration. Data input and requests are communicated to the computing device via an input device, such as a keyboard and/or mouse. Data output of the system is communicated from the computing device to a display device, such as a computer monitor.

Figure 2:
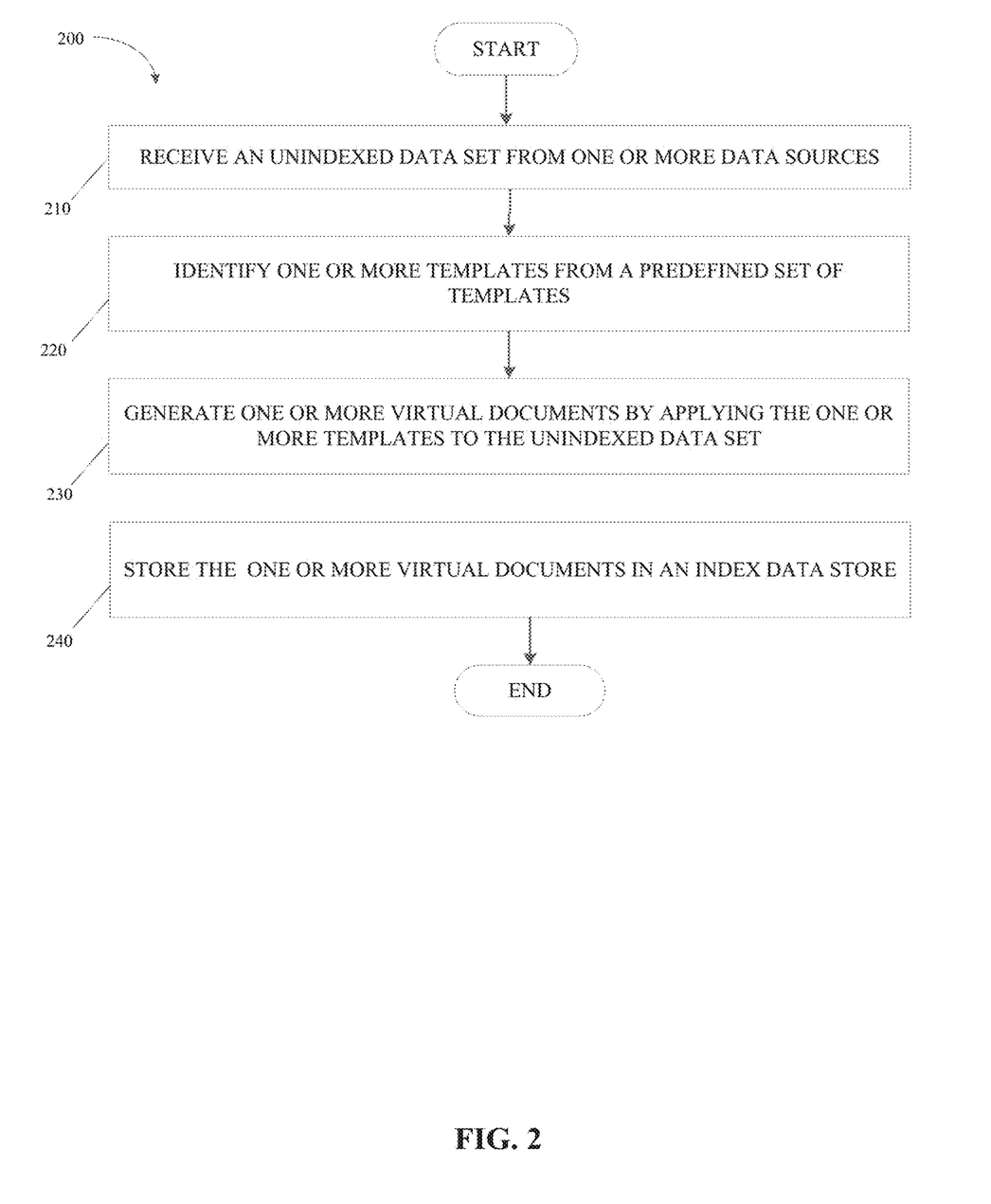
FIG. 2 is a flow diagram illustrating an exemplary computer-implemented method for generating an indexed data store.

Turning now to FIG. 2, an exemplary method 200 for generating indexed financial data to be queried is disclosed in the context of system 100 of FIG. 1. The exemplary method begins with the receipt of unindexed data set by the caption generator module 128 from one or more data sources, which according to one embodiment are maintained in data store 160, step 210. It should be noted that data store 160 is an exemplary data store repository where unindexed data from multiple source aggregated is maintained. However, the present invention is not limited single data store where aggregated data is maintained but presented herein for exemplary purposes. In one embodiment, data store 160 is representative of multiple data stores associated with multiple financial sources.

At step 220, upon receipt of the unindexed data set, the caption generator module 128 indentifies one or more templates from a predefined set of templates maintained in the template data store 136. According to one embodiment, a predefined template is a parametric template consisting of such metric fields as the (i) the type of document, (ii) the source of the data, for example, in the form of a path on disk or a SQL query that returns data from the source database source, (iii) a document identifier and (iv) a caption, which is an array of textual strings, comprising constant fixed strings and values from the data set. In one embodiment, the one or more templates are identified by the requirements of the application to which data set will be utilized for. For example, when developing an application about time-series of financial macro-economic indicators, different design templates may be used to compare time series points or to aggregate k-year ranges of time-series points in order to present to users trending results.

Returning to FIG. 2, the caption generator module 128 applies the one or more identified templates to the each of the data records in the unindexed data set in order to generate a virtual document for each data record, step 230. According to one embodiment, a virtual document comprises the named fields from the template, the document identifier and the caption field. The one or more virtual documents are subsequently stored in the index data store 132.

Figure 3:
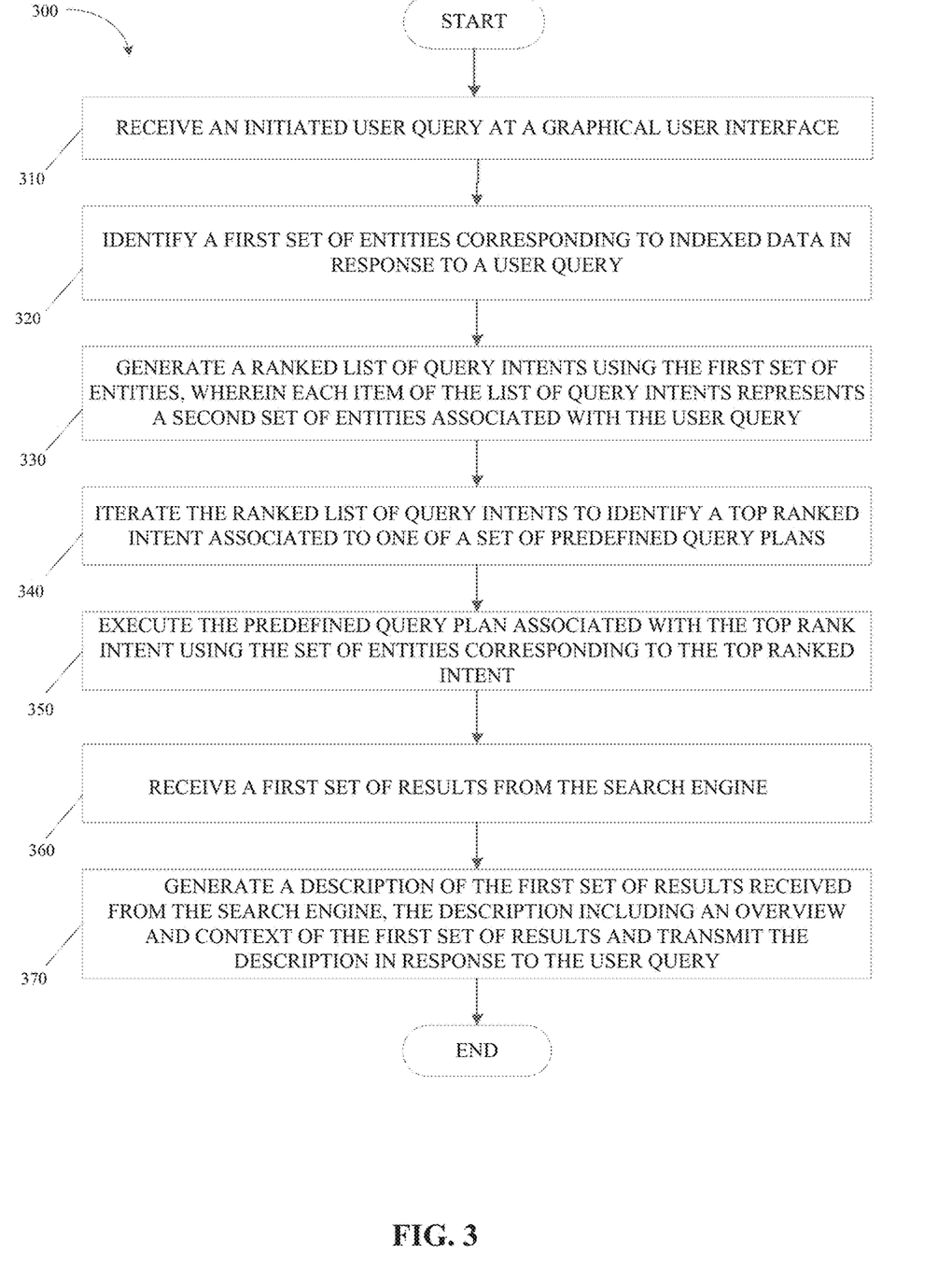
FIG. 3 is a flow diagram illustrating an exemplary computer-implemented method for searching financial data with a keyword-based methodology and natural language generation to produce human-readable answers from the resulting data.
Figure 4:
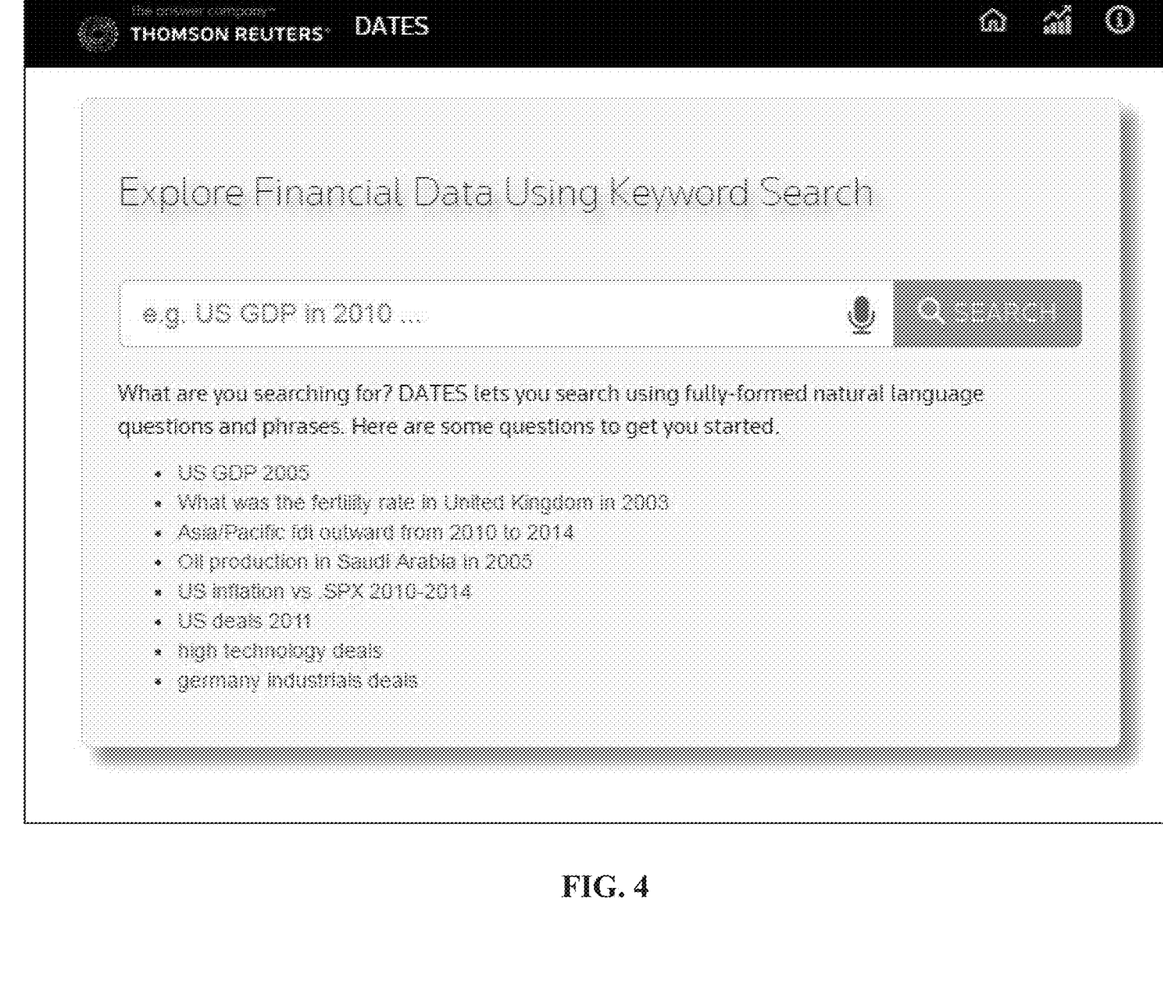
FIG. 4 is a flow diagram illustrating an exemplary user interface for query submission.

Turning now to FIG. 3, an exemplary method 300 for querying financial data with natural language queries is disclosed in the context of system 100 of FIG. 1. The exemplary method begins with the receipt of an initiated user question at the graphical user interface 154 of the access device 150, step 310. For example, a user is provided a graphical user interface, such as the shown in FIG. 4 that provides a field for the user to enter a question. In one embodiment, the user enters the question in natural language format. For example, a user may enter the question "gross domestic product for the United States in 2010". In another embodiment, the user can select predefined query from a listing of such queries made available at the graphical user interface 154. In yet another embodiment, the user may submit an audible user query through a microphone input at the graphical user interface 154 via microphone hardware, as is known in art, at the access device 150.

Once entered, the question initiated by the user is submitted to query understanding module 124 over the network 140. The query understanding module 124, upon receipt of the initiated user question, analyzes the user query and indentifies a first set of entities corresponding to indexed data maintained in the index data sore 132, step 320. According to one embodiment, the query understanding module 124 identifies a given entity according to the application requirements. For example, in the case of a macro-economic application, entities that are indentified include country names and their abbreviated symbols (e.g. US or United States), geographical regions (e.g. Western Europe), macro-economic indicators and their abbreviations (e.g. Gross National Income or GNI) and dates. Accordingly, if a user submits the query "Value of the GDP of the US in 2010", the query understanding module 124 identifies the country "U.S.", the economic indicator as "GDP" and the year "2010", which corresponds to one or more data fields in the virtual documents maintained in the index data store 132. In another example, where the financial application relates to mergers and acquisitions, identities include company names, names of financial advisors and investment banks, names of legal counsel, dates and industry sectors. Accordingly, if a user submits the query "Value of the GDP of the US in 2010", the query understanding module 124 identifies the country "US", the economic indicator as "GDP" and the year "2010". Upon identification, entities are the tagged using techniques known in the art, such as regular expression tagging, trie-based tagging and n-gram tagging.

Returning to FIG. 2, the query understanding module 124 generates a ranked list of query intents using the first set of entities, wherein each item of the list of query intents represents a second set of entities associated with the user query, step 330. According to one embodiment, a query intent is a set of entities that has been disambiguated. In one embodiment, the first set of indentified entities has a set of regular expressions applied to it in order to identify those entities which have been ambiguously tagged, which are subsequently removed, resulting in a second set of entities associated with the user query. For example, ambiguities may occur in cases where an inadvertent term is included in an entity set of country codes (e.g. the preposition "in" is mistakenly interpreted as country code 'IN"). In another embodiment, tagged entities are disambiguated based on the presence of another entity. For example, several indicators exist for Gross Domestic Product ("GDP") based in part on its expression in different units, e.g. "current US dollars" or "constant 2005 US $," yet indicators are representative of the same entity.

Returning to step 330 of FIG. 3, the query understanding module 124 then computes a score for each query intent using the following equation:

$$s(I) = \frac{\Sigma_{s \in I} s(e)}{(1+c)|I|} \quad \text{Equation 1}$$

where s(e) is a score associated with entity e adjusted by the prevalence of each indentified entity, I is a query intent, |I| is the number of entities in I and c is the number of tokens not covered by any of the entities in I. In one embodiment, the scores of each query intent is used to generate a ranked list of the of the query intents.

At step 340, the search module 122 iterates over the ranked list of query intents to identify a top ranked query intent associated to one of a set of predefined query plans. According to one embodiment, a query plan is predefined to specify the computational steps involved in answering a user query, such as searching, filtering results according to a specified condition, ranking results according to the values of a given field, aggregating values to compute the value of a function. In one embodiment, the search module 122 iteratively maps or associates the ranked list of query intents to a predefined query plan from the set of query plans maintained in the query data store 134. For example, the mapping of a query intent to a query plan is accomplished in a similar fashion to a rule-based classifier, whereby each query intent from the ranked list of query intents is checked in an iterative fashion to indentify whether the entities in a given query intent is compatible with the entities outline in a given query plan. In one embodiment, compatibility is accomplished by determining whether defined threshold requirements are satisfied, either partially or fully, by the entities of the query intent, in order to indentify that top ranked query intent. For example, a pre-defined query plan may identify that the query intent is to have a maximum of one geographic region, a maximum of one country, a specified date range (e.g. Y2008-Y2012) and a maximum of one market indicator. Accordingly, the query intent comprising the entities country "USA", date "2010" and market indicator "GDP" derived from the user query "value of GDP of the US in 2010" would be a match to the aforementioned pre-defined query plan.

At step 350, the search module 122 executes the pre-defined query plan associated with the top rank intent using the set of entities corresponding to the top ranked query intent. In one embodiment, the predefined query plan associated with the top rank includes one or more search instructions that are executed by the search module 122 on the set of virtual documents maintained in the index data store 132.

Upon completion of the execution of the pre-defined query plan, a first set of search results is generated and transmitted by the search engine 122 to the answer description generator module 126, step 360. The answer description generator module 126 subsequently generates a description of the first set of results received from the search engine, the description including an overview and context of the first set of results and transmits the description in response to the user query, step 370. In one embodiment, the answer description generator module 126 accepts the search result output and uses the top ranked query intent to select an appropriate set of language templates for text generation from the template data store 136, which it then populates with the search result data. According to one embodiment, a separate template set is maintained for each type of use case, e.g. use cases for macro-economic indicators include country-year-market indicator, country-multi-year-market indicator, region-year-indicator; and use cases for merger and acquisition deals include company-company-deal, country-sector-year-deal, sector-year-deal and country-year-deal. In one embodiment, an individual template set includes multiple rephrasing of the corresponding language to be generated. For example, an individual template set may include the following templates: (i) in [year], [country] [market indicator] stand at [amount], (ii) [country] finish [year] with a [market indicator] of [amount], and (iii) [country] [indicator] end [year] at [amount]. Additional variation is achieved through verb selection at the lexical level. In one embodiment, verb choice patterns are selected based on percentage changes. For example, verbs associated with smaller percentage changes (e.g. inch, ease) can be distinguished from verbs associated with larger changes (e.g. skyrocket, plummet). An exemplary template is as follows: [country] [indicator] for [year] averaged [amount] [verb of motion] [percentage_change] from [start_value] in [year_start] to [end_value] in [year_end].

Figure 5:
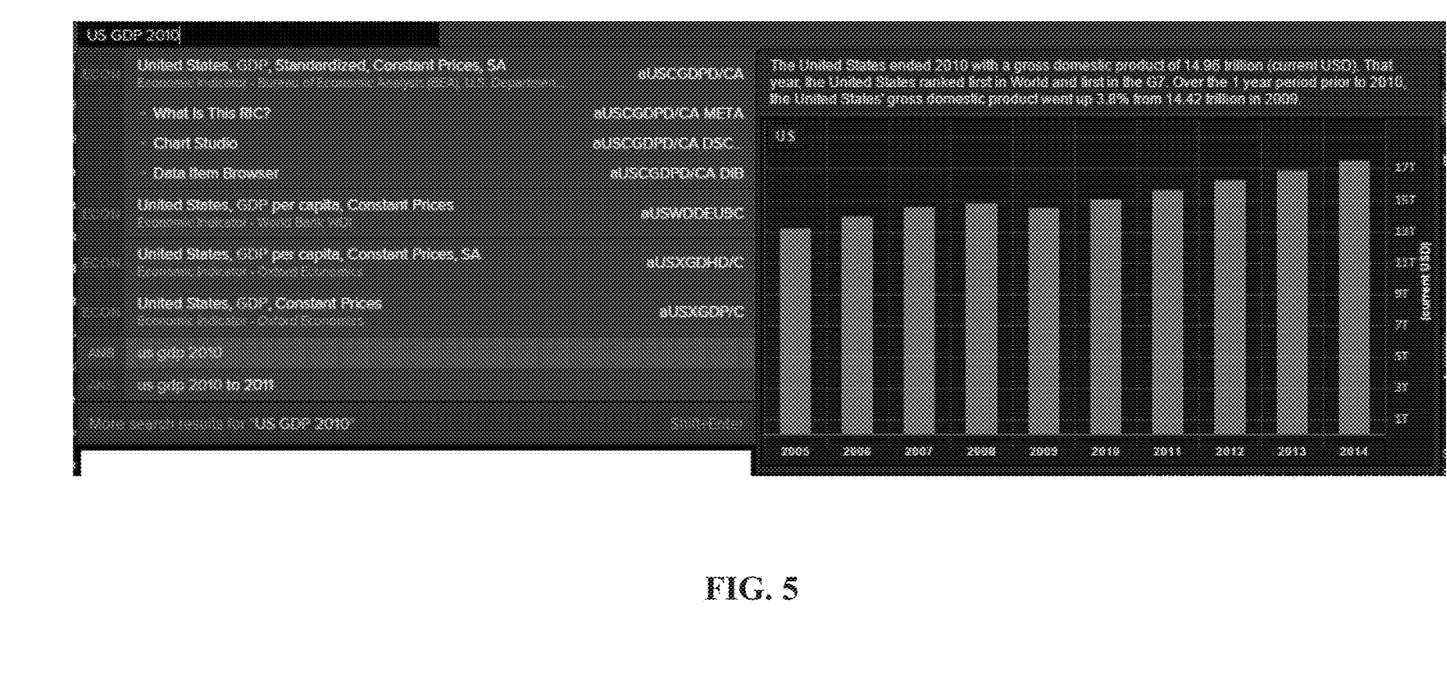
FIG. 5 are screen diagrams of the exemplary user interface depicting human-readable answers from the resulting data in response to a search query.

Returning to step 370 of FIG. 3, the natural language description is transmitted to the user interface 154 of the access device 150. FIG. 5 illustrates an exemplary search result for the query intent "US GDP 2005". The user can read the generated answer description or use audible technology as is known in the art to hear the spoken answer. In one embodiment, if the user were to submit the same initial query again or the results page is refreshed, a variation of the answer description may be provided. In another embodiment, in addition to the automatically generated description, there is a list of alternative interpretations of the query that the system provides in case the user query can be understood in more than one way by the system, which can be selected by the user in order to update the results accordingly. In another embodiment, a set of query-dependent visualizations that support the automatically generated answer description is included, such as the GDP timeline illustrated in FIG. 5. In yet another embodiment, relevant third party content, such as relevant news articles and other web content, retrieved for the country and market indicator may also be included.

FIGS. 1 through 5 are conceptual illustrations allowing for an explanation of the present disclosure. It should be understood that various aspects of the embodiments of the present disclosure could be implemented in hardware, firmware, software, or combinations thereof. In such embodiments, the various components and/or steps would be implemented in hardware, firmware, and/or software to perform the functions of the present disclosure. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the disclosure as described herein. In this document, the terms "machine readable medium", "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present disclosure to a single embodiment, as other embodiments are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an embodiment showing a singular component should not necessarily be limited to other embodiments including a plurality of the same component, and vice-versa, unless explicitly stated otherwise herein. Moreover, the applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific embodiments so fully reveals the general nature of the disclosure that others can, by applying knowledge within the skill of the relevant art(s), readily modify and/or adapt for various applications such specific embodiments, without undue experimentation, without departing from the general concept of the present disclosure. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present disclosure have been described above, it should be understood that they have been presented by way of example, and not as limitations. It would be apparent to one skilled in the relevant art(s) that various changes in form and detail could be made therein without departing from the spirit and scope of the disclosure. Thus, the present disclosure should not be limited by any of the above-described exemplary embodiments, but should be defined only in accordance with the following claims and their equivalents.

What is claimed is:

1. A computer-implemented method comprising:
   identifying a first set of entities corresponding to an indexed data set in response to a user query, wherein the indexed data set includes indexed virtual documents that have been generated using one or more unindexed data sets, wherein the indexed virtual documents are generated and indexed by applying one or more templates from a set of predefined set of templates to the one or more unindexed data sets;
   generating a ranked list of query intents using the first set of entities, wherein each query intent of the list of query intents represents a second set of entities associated with the user query, and wherein the generating a ranked list of query intents includes:
      computing a score for each query intent of the list of query intents, wherein computing a score for a query intent of the list of query intents is based at least in part on a prevalence of at least one entity of the second set of entities represented by the query intent across the second sets of entities represented by each of the list of query intents; and
      ranking each query intent of the list of query intents based on the computed score to generate the ranked list of query intents;
   identifying a query plan from a set of predefined query plans;
   iterating over the ranked list of query intents to identify a top ranked intent associated to the query plan;
   executing the query plan associated with the top ranked intent using the set of entities corresponding to the top ranked intent, the query plan comprising one or more search actions against the indexed data set;
   receiving a first set of results in response to one or more search actions;
   selecting a language template for text generation based on the first set of results;
   generating a description of the first set of results using the language template; and
   transmitting the description in response to the user query.

2. The computer-implemented method of claim 1, wherein the second set of entities associated with the user query is generated by disambiguation of the first set of entities.

3. The computer-implemented method of claim 1, wherein the query plan further comprises at least one of filtering results according to a specified condition, ranking results according to the values of a given field or aggregating associated values.

4. The computer-implemented method of claim 1, wherein the description further comprises an overview and context of the first set of results.

5. The computer-implemented method of claim 1, wherein generating the description of the first set of results further comprises populating the language template with one or more data items from the first set of results.

6. A system comprising:
   a non-transient memory; and
   a server including a processor configured to:
      identify a first set of entities corresponding to an indexed data set in response to a user query, wherein the indexed data set includes indexed virtual documents that have been generated using one or more unindexed data sets, wherein the indexed virtual documents are generated and indexed by applying one or more templates from a set of predefined set of templates to the one or more unindexed data sets;
      generate a ranked list of query intents using the first set of entities, wherein each query intent of the list of query intents represents a second set of entities associated with the user query, and wherein the configuration of the processor to generate a ranked list of query intents includes configuration of the processor to:
         compute a score for each query intent of the list of query intents, wherein computing a score for a query intent of the list of query intents is based at least in part on a prevalence of at least one entity of the second set of entities represented by the query intent across the second sets of entities represented by each of the list of query intents; and rank each query intent of the list of query intents based on the computed score to generate the ranked list of query intents;

identify a query plan from a set of predefined query plans;

iterate over the ranked list of query intents to identify a top ranked intent associated to the query plan;

execute the query plan associated with the top ranked intent using the set of entities corresponding to the top ranked intent, the query plan comprising one or more search actions against the indexed data set;

receive a first set of results in response to one or more search actions;

select a language template for text generation based on the first set of results;

generate a description of the first set of results; and transmit the description in response to the user query.

7. The system of claim 6, wherein the second set of entities associated with the user query is generated by disambiguation of the first set of entities.

8. The system of claim 6, wherein the query plan further comprises at least one of filtering results according to a specified condition, ranking results according to the values of a given field or aggregating associated values.

9. The system of claim 6, wherein the description further comprises an overview and context of the first set of results.

10. The system of claim 6, wherein generating the description of the first set of results further comprises populating the language template with one or more data items from the first set of results.

* * * * *